United States Patent
Mishra et al.

(10) Patent No.: US 12,273,604 B2
(45) Date of Patent: Apr. 8, 2025

(54) METHOD AND SYSTEM TO HIGHLIGHT VIDEO SEGMENTS IN A VIDEO STREAM

(71) Applicant: iStreamPlanet Co., LLC, Las Vegas, NV (US)

(72) Inventors: Nachiketa Mishra, Fremont, CA (US); Steven Roeder, Seattle, WA (US); Stephen Slotnick, Seattle, WA (US)

(73) Assignee: iStreamPlanet Co., LLC, Las Vegas, NV (US)

( * ) Notice: Subject to any disclaimer, the term of this patent is extended or adjusted under 35 U.S.C. 154(b) by 0 days.

(21) Appl. No.: 17/696,747

(22) Filed: Mar. 16, 2022

(65) Prior Publication Data

US 2023/0300430 A1 Sep. 21, 2023

(51) Int. Cl.
*H04N 21/8549* (2011.01)
*G06V 10/82* (2022.01)
*G11B 27/34* (2006.01)
*H04N 21/234* (2011.01)
*H04N 21/431* (2011.01)

(52) U.S. Cl.
CPC ......... *H04N 21/8549* (2013.01); *G06V 10/82* (2022.01); *G11B 27/34* (2013.01); *H04N 21/23418* (2013.01); *H04N 21/4312* (2013.01)

(58) Field of Classification Search
None
See application file for complete search history.

(56) References Cited

U.S. PATENT DOCUMENTS

| | | | |
|---|---|---|---|
| 9,141,859 B2 | 9/2015 | Vunic | |
| 9,141,860 B2 | 9/2015 | Vunic et al. | |
| 9,367,745 B2 | 6/2016 | Petajan et al. | |
| 9,659,597 B2 | 5/2017 | Petajan et al. | |
| 10,972,809 B1* | 4/2021 | Key | H04N 21/23439 |
| 2013/0011121 A1* | 1/2013 | Forsyth | G11B 27/034 386/245 |
| 2013/0283143 A1 | 10/2013 | Petajan et al. | |
| 2018/0020243 A1* | 1/2018 | Ni | H04N 21/23418 |
| 2018/0025078 A1* | 1/2018 | Quennesson | H04N 21/4788 725/141 |
| 2019/0373310 A1* | 12/2019 | Stojancic | G10L 25/18 |

(Continued)

OTHER PUBLICATIONS

Baijal et al., "Sports Highlights Generation based on Acoustic Events Detection: A Rugby Case Study", Available Online at <https://arxiv.org/pdf/1509.06279.pdf>, IEEE International Conference on Consumer Electronics (ICCE), 2015, 5 pages.

(Continued)

*Primary Examiner* — Heather R Jones
(74) *Attorney, Agent, or Firm* — Bookoff McAndrews, PLLC

(57) ABSTRACT

A method to highlight video segments in a video stream, where the method includes receiving a video stream from a video source, identifying a highlight segment within the video stream based on a machine learning model, the highlight segment being deemed to be worthy of replay by the machine learning model, and starting and ending frames of the highlight segment being identified by applying the machine learning model to the video stream and corresponding audio data, and providing an availability indication of the highlight segment in the video stream once the starting and ending frames of the highlight segment are identified.

19 Claims, 9 Drawing Sheets

(56) References Cited

U.S. PATENT DOCUMENTS

2021/0150222 A1\* 5/2021 Evans .................. H04N 21/251
2022/0182722 A1\* 6/2022 Bolivar .............. H04N 21/8456

OTHER PUBLICATIONS

Hsieh et al., "Spotlight: A Smart Video Highlight Generator (Stanford University CS231N Final Project Report)", Available Online at <http://cs231n.stanford.edu/reports/2017/pdfs/708.pdf>, Stanford University, Department of Computer Science, 2017, pp. 1-7.

LILLY @ CONTENDA, "Using Machine Learning to Find Twitch Stream Highlights", Available Online at <https://medium.com/@contenda/using-machine-learning-to-find-twitch-stream-highlights-6dc7b59685e2>, Aug. 14, 2021, 3 pages.

Narkhede, Sarang, "Understanding AUC—ROC Curve", Available Online at <https://towardsdatascience.com/understanding-auc-roc-curve-68b2303cc9c5>, Towards Data Science, Jun. 26, 2018, 4 pages.

Pai, Aravind, "Become a Video Analysis Expert: A Simple Approach to Automatically Generating Highlights using Python", Available Online at <https://www.analyticsvidhya.com/blog/2019/09/guide-automatic-highlight-generation-python-without-machine-learning/>, Sep. 9, 2019, 8 pages.

Shen, Jimmy, "ROC (Receiver Operating Characteristic) and EER (Equal Error Rate)", Available Online at <https://jimmy-shen.medium.com/roc-receiver-operating-characteristic-and-eer-equal-error-rate-ac5a576fae38>, Sep. 28, 2020, 2 pages.

Subramanian et al., "Automatically Detect Sports Highlights in Video with Amazon SageMaker", Available Online at <https://aws.amazon.com/blogs/machine-learning/automatically-detect-sports-highlights-in-video-with-amazon-sagemaker/>, AWS Machine Learning Blog, Nov. 12, 2021, 19 pages.

Tang et al., "Detecting Highlights in Sports Videos: Cricket as a Test Case", Available Online at <https://static.googleusercontent.com/media/research.google.com/en//pubs/archive/37109.pdf>, 2011 IEEE International Conference on Multimedia and Expo, Jul. 2011, 6 pages.

\* cited by examiner

METHOD AND SYSTEM TO HIGHLIGHT VIDEO SEGMENTS IN A VIDEO STREAM

TECHNICAL FIELD

The embodiments of the invention are related to the field of managing video and image content. More specifically, the embodiments of the invention relate to methods and systems for highlighting video segments in a video stream.

BACKGROUND ART

User engagement on streaming media is crucial for the growth of business. With user generated video taking over the social media platforms, the advent of short videos has been engaging and rewarding for media companies to increase their revenue, new subscriber acquisition, and continued viewer engagement on their content. The short videos may be generated from a video stream, and these short videos may be referred to as highlights of the video stream. Generating these highlights in real-time or near real-time has a lot of potential in enhancing user engagement.

Highlight generation on streaming video has been either a manual or semi-automated effort. It is difficult to figure out which frames in video segments are relevant for highlights and analyze the associated audio with those frames and derive relevant highlights. Generating these highlights automatically without human involvement within the context of a video segment in near real-time is an additional challenge. As a result, while a few solutions provide highlight generation on Video-on-Demand (VOD) assets, they do not provide efficient highlight generation for live streaming media.

Furthermore, it is challenging for a video streaming platform to provide the highlights of video streams efficiently so that a user playback device (e.g., a television, a smartphone, or another display device) may manage the highlights along with the video streams and provide a seamless and interactive user experience to an end-user to view both a video stream and the highlight(s) within the video stream.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1A:
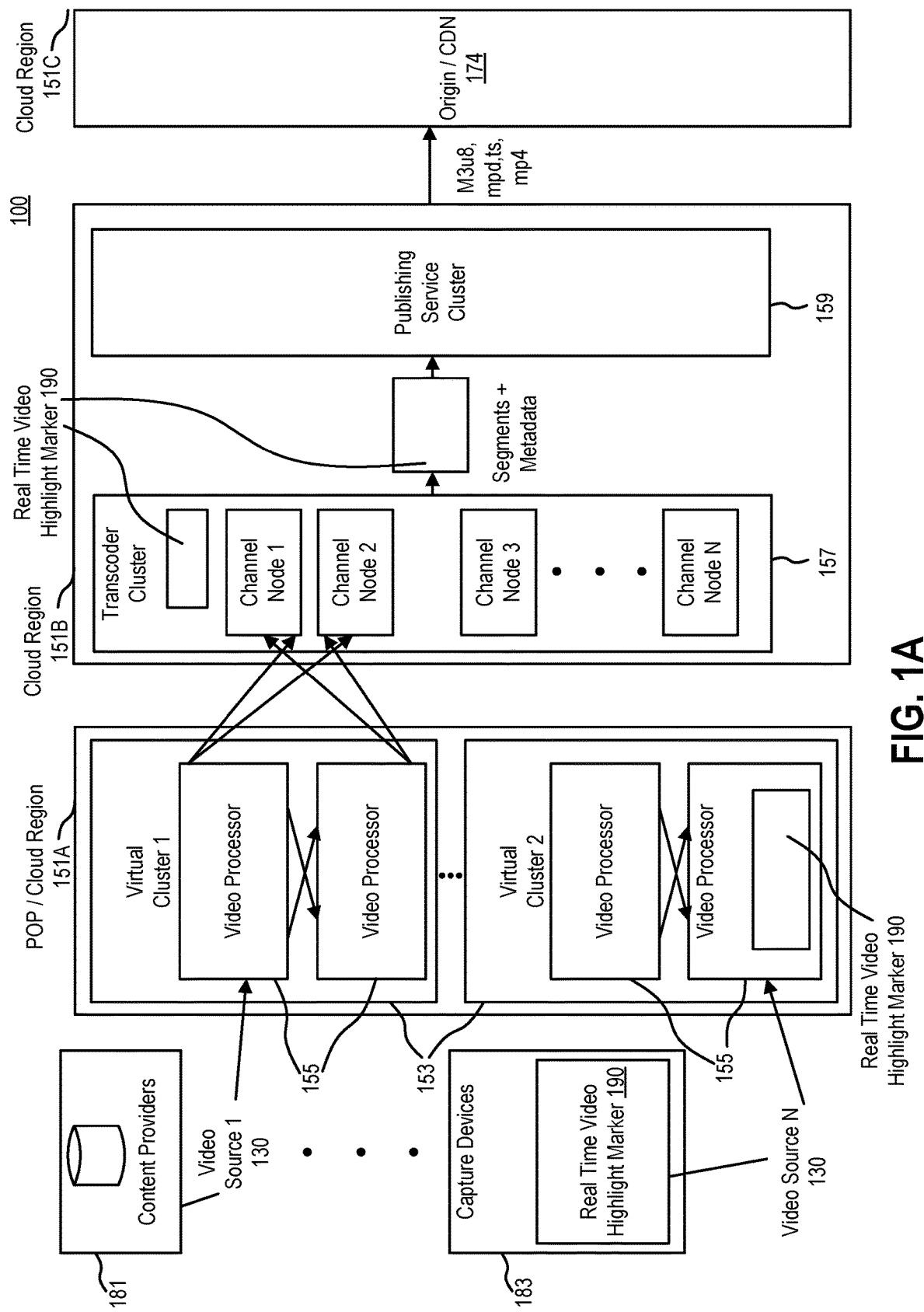
FIG. 1A is a diagram of one embodiment of a video streaming system supporting video highlight generation.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein, refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical, or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) to establish network connections (to transmit and/or receive code and/or data using propagating signals) with other electronic devices.

Based on machine learning models, embodiments of the invention identify highlight segments within video streams contemporaneously as the video streams are being processed through a video streaming system, where the highlight segments of the video streams may be provided along with the corresponding video streams so that a playback device receiving a highlight segment of a corresponding video stream may display the highlight segment upon request (e.g., an end-user may request the highlight segment through a user interface) when the corresponding video stream is displayed at the playback device.

Note that a video highlight segment of a video stream is also referred to as a highlight segment (or simply a highlight), a short video, a video clip, or a short/brief/quick/fast/condensed/highlight movie/segment/clip/reel of the video stream. The video highlight segment comprises a set of video frames within a duration of the video stream, corresponding audio data and metadata of the set of video frames, and represents the essence and/or most important part (e.g., key points/moments) of the video stream thus is considered of being worthy of replay and/or sharing with other users. While some video highlight segments are consecutive frames within the duration of the video stream, others may be discrete sample frames (e.g., condensed with every other frame or frames with another stride size within the duration). When a video highlight segment includes discrete sample frames, these sample frames may be aggregated together to form a condensed sequence of video frames for a playback device to play the condensed sequence of video frames when the end user selects to play the video highlight segment, or they may be marked within the existing video frames so that the playback device may play the marked video frames only within a video highlight segment when the end user selects to play the video highlight segment. Note that a video highlight segment may include multiple video segments of a video stream that are aggregated (also referred to as accumulated or stitched) together.

By marking a video highlight segment within a video stream contemporaneously with processing of the video stream and indicating the availability of the video highlight segment to a playback device, a video streaming system provides a more interactive streaming experience to an end user of the playback device of the video streaming system by allowing the end user to replay and/or share the most exciting portion of a video stream during the period that the video stream is streamed from the video streaming system in real time. Note that marking the video highlight segment within a video stream may comprise identifying frames (consecutive or discrete frames) of the video stream to be included in a video highlight segments without generating a new video highlight segment separated from the video stream; and additionally or alternatively, the marking may comprise generating the new video highlight segment separated from the video stream.

The contemporaneousness of marking the highlight segment of the video stream refers to the marking that is done in real time or near real time (within seconds or minutes) as the video stream is being processed in the video streaming system. For example, when the video stream is about an American Football game, a highlight segment of the video stream may be the clip that includes the first frame for the beginning of the down that results in the latest touchdown to the last frame of the down, and the highlight segment is marked within seconds or minutes of the last frame of the down being processed by the video streaming system and distributed through a content distribution network (CDN) to playback devices. An end user may play the highlight segment through selecting a replay option using a graphic user interface (GUI) available at a playback device during the video stream system's broadcasting of the video stream. An electronic device to mark the highlight segments of video streams implements a real time video highlight marker and/or a real time video highlight manager as discussed in detail herein.

Video Streaming System in a Cloud Computing Environment

FIG. 1A is a first embodiment of a video streaming system to support video highlight generation in a cloud computing environment. The cloud computing environment can include a set of cloud regions 151A-C. These cloud regions can be different cloud computing environments provided by a same or different cloud computing provider. The cloud regions 151A-C can have different geographic locations and electronic device components and resources that are interconnected via communication networks with the other cloud regions 151A-C. Any number, configuration, and variety of cloud computing environments and regions 151A-C can be utilized to provide the video streaming system 100. In some embodiments, some of the components of the video streaming system 100 are located in a set of electronic devices referred to as a point of presence (POP). The POP 151A can be provided by an internet service provider or similar interface through which external resources and electronic devices can interact with the cloud computing environment.

In an example embodiment, the video streaming system 100 includes a set of virtual clusters 153, a transcode cluster 157, and a publishing service cluster 159. Each cluster can be composed of any number and combination of electronic devices including servers, storage devices, networking devices, and related devices that make up a cloud computing environment. The virtual clusters 153 can support a set of video processors 155. These video processors 155 can execute software components that process the incoming video sources 130 and are hosted by the virtual clusters 153. The video processors 155 can perform tasks associated with each video source 130 to process that video source and can be considered a unit of work or a worker in the video streaming system 100. Each video processor 155 can perform a single task or multiple tasks and can operate in conjunction with other video processors 155 to process the video sources 130. Any number of virtual clusters 153 can manage any number of video processors 155, which together can process any number of video sources 130. Video processors 155 can implement video highlight generation in real time or near real-time by executing a real time video highlight marker 190 as well as perform any number of other video processing tasks. While a single video processor 155 is illustrated as providing a real time video highlight marker 190, any number of the video processors 155 can support this function/circuitry.

Video sources 130 include video streams, which can be any type of video input in any format that is provided by any source device or set of devices. For example, video sources can be provided by a set of content providers 181, which are sets of devices operated by an entity that produces a video source 130 to be processed by the video streaming system 100. In some cases, the video sources 130 can be provided directly or indirectly by a set of capture devices 183 such as live programming (e.g., sporting events). Any content provider 181, capture device 183, or similar set of devices providing the video sources 130 can execute or be in communication with a device executing a real time video highlight marker 190. A real time video highlight marker 190, as further described herein, generates one or more video highlight segments from video streams. This real time video highlight marker 190 can be implemented at any number of points within the video streaming system 100 such that highlight segments from video streams can be identified at each stage.

The output of the video processors 155 can be provided to a transcode cluster 157. The transcode cluster 157 can further process the video sources to organize the video sources into a set of channels handled by associated channel nodes 125. The transcode cluster 157 and channel nodes 125 can combine video sources from the video processors 155 and encode the resulting video streams according to the configuration of the respective channels to be distributed to the publishing service cluster 159. A transcode cluster 157 is a set of electronic device resources including servers, storage devices, and networking devices that support any number of channel nodes 125. Similarly, the publishing service cluster is a set of electronic device resources including servers, storage devices, and networking devices that support any number of video streams that are to be published to a content distribution network 174 or in some cases returned to an origin server (e.g., a video source provider or other entity that may publish the video stream). In some embodiments, the transcode cluster 157 can output the video streams as segments and associated metadata. In some embodiments, these audio/video segments may be encoded using formats such as moving picture experts group advanced audio coding (AAC), transport stream (TS), moving picture experts group (MPEG) 4 (MP4) and similar video encoding formats. In some embodiments, the publishing service can format the streams using streaming protocols such as HTTP live streaming (M3u8) or MPEG-DASH media presentation description (MPD). As used herein video, audio/video, and similar terms are used interchangeably to include video formats that may also encompass audio and metadata aspects (e.g., an audio stream may be processed and synchronized with an accompanying video stream, and then published within an integrated stream (in-band) including both audio and video streams or separate but synchronized audio and video streams).

Figure 1B:
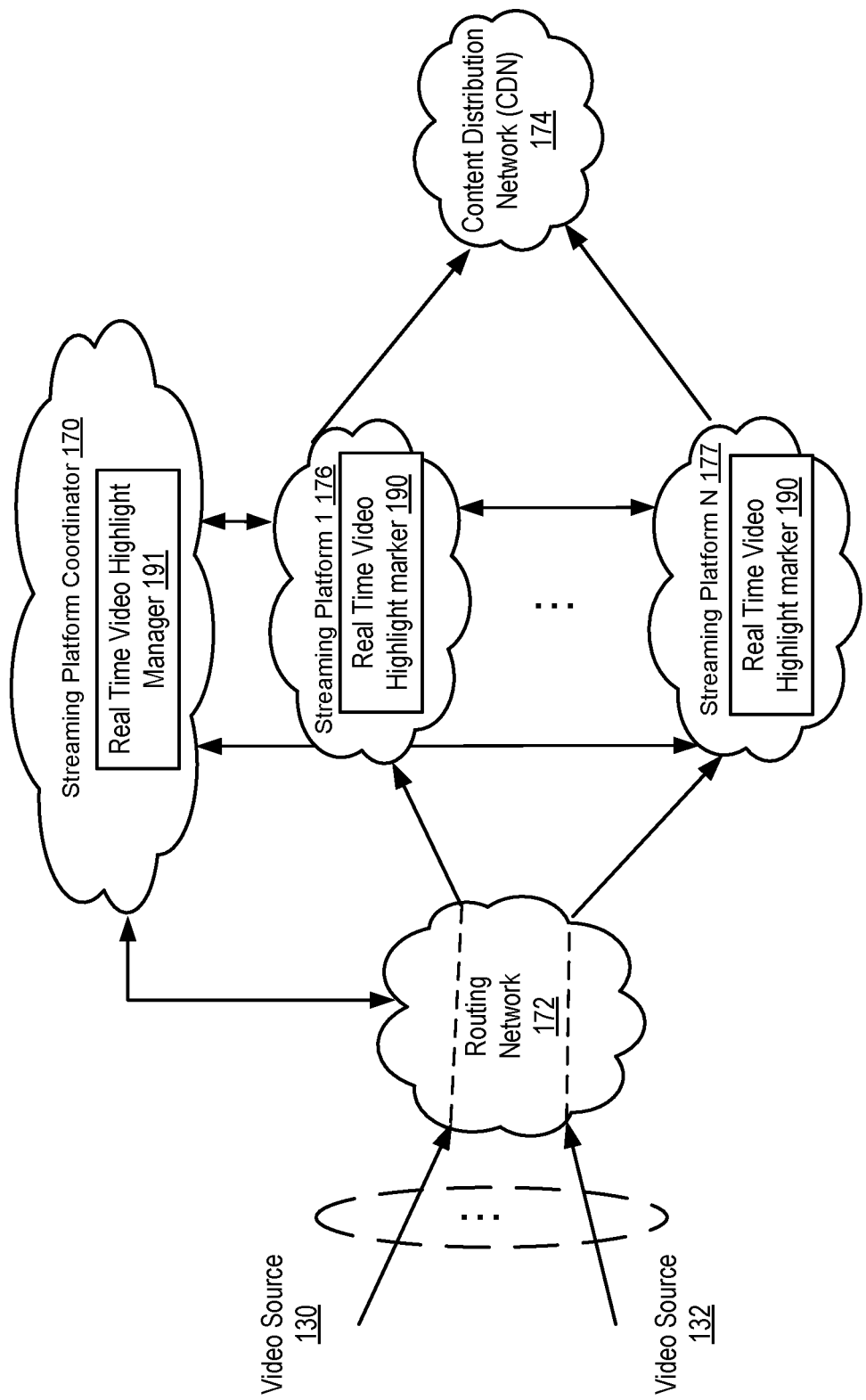
FIG. 1B is a diagram of another embodiment of a video streaming system containing multiple video streaming platforms.

FIG. 1B illustrates another embodiment of a video streaming system containing multiple video streaming platforms. A video streaming system 150 includes multiple video streaming platforms represented by a streaming platform 1 through a streaming platform N at references 176 and 177, a content distribution network 174, and a streaming platform coordinator 170.

The streaming platform coordinator 170 communicates with all the video streaming platforms including the streaming platforms 1 through N. The streaming platform coordinator 170 coordinates processing of the media contents routed to the various video streaming platforms. The processed media contents from the video sources are then published to the content distribution network (CDN) 174.

It is to be noted that the various video streaming platforms and/or the streaming platform coordinator may be hosted by any one or more of various cloud computing providers. When two video streaming platforms are hosted by two different cloud computing providers, which generally offer computing resources with different characteristics, the two video streaming platforms are often referred to as heterogeneous video streaming platforms (versus homogenous video streaming platforms hosted by the same cloud computing providers). Cloud computing providers are building up their infrastructures at various geographic locations, and it is now practical for the video streaming system to utilize the cloud infrastructures concurrently at the various geographic locations and/or by different cloud computing providers.

Each video streaming platform may contain any number of real time video highlight marking processes, which is illustrated as a set of real time video highlight markers 190 in streaming platforms 1 to N, respectively. The real time video highlight markers 190 are to generate video highlight segments from input video sources 130 to 132, caused by processing media workflows created for video sources in a video streaming platform as discussed in more details herein below, or in similar processing of the received media (i.e., video) as it is received from the video sources, handled by the streaming platforms, and forwarded via the content distribution network (CDN) 174.

In some embodiments, the streaming platform coordinator 170 may contain a real time video highlight manager 191 that similarly marks video highlight segments of video streams, that manages the real time video highlight markers 190 across the streaming platforms, or that collects video highlight segments and/or their metadata from the processing of media workflows in all video streaming platforms the streaming platform coordinator 170 interacts with, and the streaming platform coordinator 170 may manage or coordinate notifying a feedback mechanism or corrective components to address any issues in marking highlight segments. The real time video highlight manager 191 can also coordinate resources related to the real time video highlight markers 190 at different video streaming platforms. Where a feedback mechanism is available in the system 150, the real time video highlight manager 191 or real time video highlight markers 190 can send notification of availability of video highlight segments to the feedback mechanism that may report the changes to a video source or administrator. In cases where corrective components are available in the system 150, the reporting of the availability of video highlight segments can trigger further processing to utilize the video highlight segments. Note that the reporting of the availability of video highlight segments can specify the confidence scores of the video highlight segments (e.g., likelihood the video highlight segment is worthy of replay), metrics related to the video highlight segments, as well as other relevant information for providing the video highlight segments from the streams in the system 150.

Video Streaming Platform in a Cloud Computing Environment

A set of video streaming platforms 176 to 177 is a main component of a video streaming system 150 as illustrated in FIG. 1B. The video streaming platforms 176 and the streaming platform coordinator 170 can perform any number of operations to process any number of input video sources 130 to 132, which may be routed through a routing network 172, and output via a content distribution network (CDN) 174 to reach any number of consuming devices and software applications. The operations performed on the video sources 130 to 132 can include the real time video highlight processes described herein implemented by real time video highlight markers 190 and similar components. Each video streaming platform 176 can execute any number of real time video highlight markers 190 using workers or similar mechanism as described further herein. The real time video highlight markers 190 can operate on a per video streaming platform 176, per video source 130-132 or similar basis.

Figure 2:
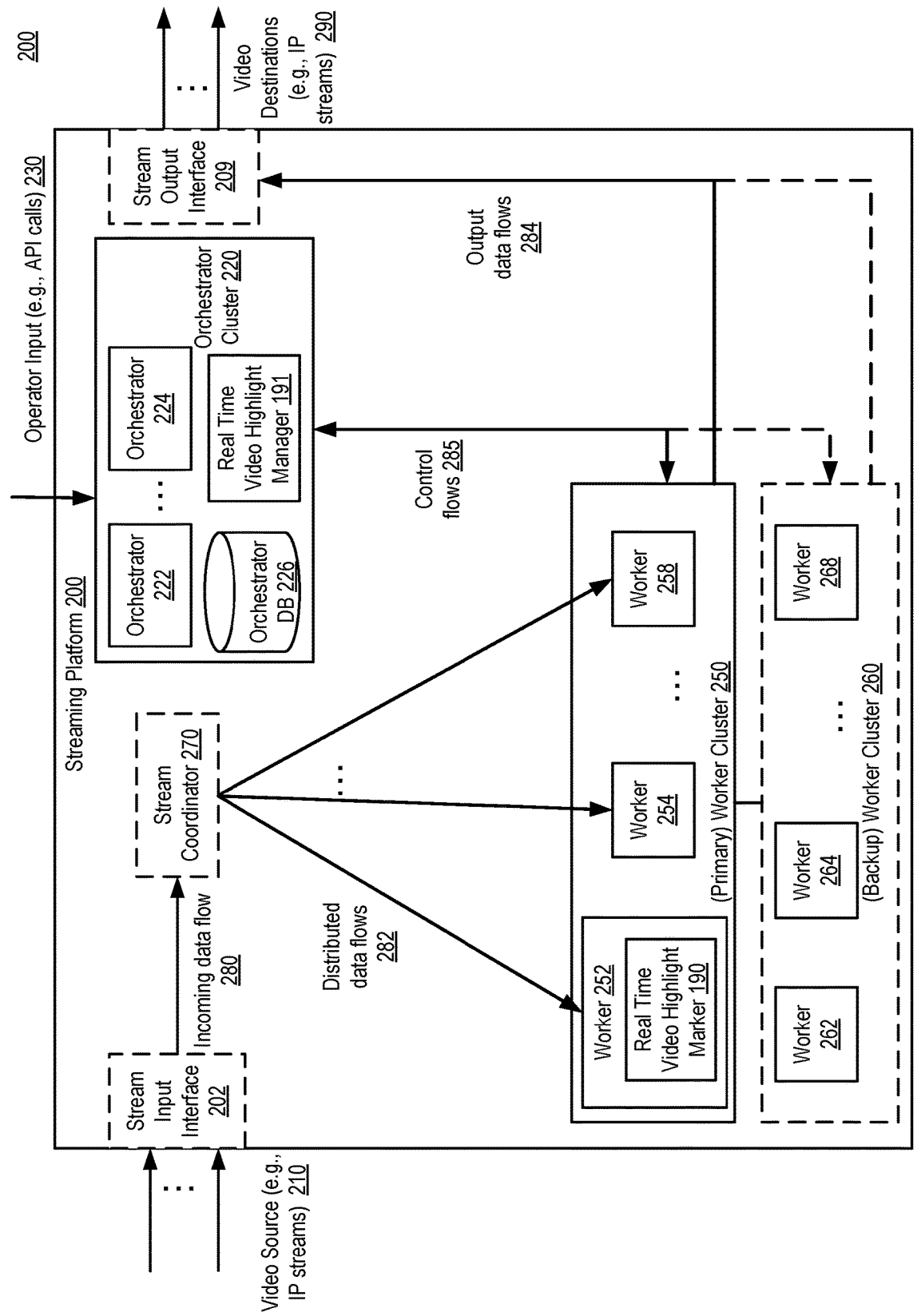
FIG. 2 is a diagram of one embodiment of one of the video streaming platforms in the video streaming system.

The architecture of the video streaming platform and its operations are discussed in more detailed discussion with relation to the additional figures. FIG. 2 illustrates a video streaming platform in a cloud computing environment according to one embodiment of the invention. A streaming platform 200 (also referred to as a video streaming platform, and the two terms are used interchangeably in the specification) is a computing system, and it contains one or more machines including one or more server computers, gateways, routers, or other computing/networking electronic devices. A streaming platform coordinator (such as the streaming platform coordinator 170) manages operations of the streaming platform 200, yet some or all of the electronic devices within the streaming platform 200 may be owned by a third party such as a cloud computing provider discussed herein above. That is, a cloud computing environment operated by a cloud computing provider may host the streaming platform 200.

The streaming platform 200 receives its data flow input at a stream input interface 202 in one embodiment. For example, video sources to be processed by the streaming platform 200 enter through the stream input interface 202. A video source contains one or more Internet Packet (IP) packet streams in one embodiment. The IP packet streams may contain one or more live video feeds. A live video feed may be video of a live event (or live performance) or may be video of a prerecorded event being played back according to a schedule. The live video feed may be a video broadcasted over cable, satellite, or over-the-air. It is to be noted that the terms "video source," "video stream," and "video feed," as used interchangeably herein, refer to the video and corresponding audio of the particular recorded event (e.g., TV show, live performance, sporting event, etc.), but also may include video only. Additionally, the video source (sometimes referred to as the video and audio streams) of the streaming platform 200 may contain only audio (e.g., an Internet radio stream). A video source 210 may also include metadata characterizing the video source such as compression/coding schemes used in the video source, broadcast signaling, and also the author, date created, location shot, camera information, and upload date of the video source. The video source may be a webcast of a television broadcast, such as of a sporting event, a live or recorded performance, a live or recorded news report, or the like. A live event may also have pre-recorded content intermingled with live media content, such as advertisements, which are played in between the live telecast. It should be noted that the embodiments of the invention described herein may also be used for streaming video-on-demand (VOD) and any other type or combination of pre-recorded audio/video content.

A video source may be "pushed" to the streaming platform 200 where the video source is IP packet streams such as the Moving Picture Experts Group (MPEG)— transport streams (MPEG-TS). The IP packet streams logically flow to streaming platform 200 from an external source thus the video source is referred to as being pushed to the streaming platform 200.

A video source may also be "pulled" by a processing unit (referred to as a worker) of streaming platform 200, where the worker runs one or more processing tasks. The worker may initiate a Transmission Control Protocol (TCP) or User Datagram Protocol (UDP) connection (or a connection in another transport or higher layer protocol) to an external uniform resource identifier (URI) (an external uniform resource locator (URL) or an external uniform resource name (URN)), and after performing a protocol handshake, cause inbound IP packet streams to flow directly into the worker for one or more processing tasks without being processed by the optional stream input interface 202 or the stream coordinator 270. The pull of video feeds may be implemented through the real time messaging protocol (RTMP), where the processing task includes a RTMP capture task.

The stream input interface 202 is a logical input point for data flows into the streaming platform 200. It may not be present as a physical entity of the streaming platform 200 in one embodiment. From the stream input interface 202, a video source becomes an incoming data flow 280. The incoming data flow contains data of one or more video and audio streams. In one embodiment, the incoming data flow is transmitted in user datagram protocol (UDP) packets. The incoming data flow 280 may optionally go to a stream coordinator 270, which converts unicast data flows into distributed data flows 282.

Workers may be organized as worker clusters in a streaming platform. In the streaming platform 200, workers 252 to 258 are in a primary worker cluster 250, which contains workers actively working on processing tasks. Workers 262 to 268 are in a backup worker cluster 260, which contains workers remains standby thus provides redundancy and robustness for the streaming platform 200. Workers perform tasks through coordination with one or more orchestrators, which may form an orchestrator cluster such as an orchestrator cluster 220. The orchestrator cluster 220 interacts with worker clusters 250 to 260 through one or more control flows, included in control and performance data flows 285.

The orchestrator cluster 220 contains orchestrators 222 to 224 and an orchestrator database 226 that stores data for operations of the orchestrators. The orchestrators may form load-balanced group within an orchestrator cluster, and the orchestrator cluster may be paired with another separately located orchestrator cluster (e.g., the other orchestrator cluster being at a different rack or even a different geographic location) for redundancy and robustness purposes too. An orchestrator creates a workflow for a video source in the streaming platform 200, and it may also host services responsible for work scheduling and overall system health monitoring and management. In some embodiments, the orchestrator database 226 is optional. For example, each of the orchestrators 222 to 224 contain a distributed in-memory storage to store information for the operations by the orchestrator 222 to 224 and/or orchestrator cluster 220. In the alternative, a database outside of the orchestrator cluster 220 may store the information for the operations by the orchestrator 222 to 224 and/or orchestrator cluster 220 (e.g., the database may be stored in a streaming platform coordinator such as the streaming platform coordinator 170 in FIG. 1).

Workers are coupled to one or more orchestrators, and the workers execute processing tasks on the distributed data flows 282. The data flows are processed, and the workers produce output data flows 284. The output data flows 284 may optionally transmit to a stream output interface 209, a logical output point for the data flows going out of the streaming platform 200. It is to be noted that both the stream input interface 202 and the stream output interface 209 may be integrated into parts of worker functions and they may not be individual physical units of the streaming platform 200.

Output data flows goes to video destinations 290, which contains one or more IP streams in one embodiment. The output data flows may be delivered to an ingest point of a content delivery network (CDN). A CDN is a system of computers networked together across the Internet that cooperates transparently to deliver content, and may include, for example, one or more origin content servers, web servers, cache servers, edge servers, etc. The output data flows may also be delivered to a video playback device directly. A single output data flow may be delivered to multiple destinations through multicast.

It is to be noted that both workers and orchestrators of the streaming platform may be implemented on cloud-hosted virtual machines (VMs). The VMs are parts of the cloud computing environment hosting the streaming platform and they reside on computing systems of the cloud computing environment. These computing systems are referred to as hosts of the workers and orchestrators in the streaming platform 200. The hosts are managed by a cloud provider, and they may concurrently host applications other than the video streaming platform. Thus, the worker hosts are not dedicated to the streaming platform, and they are allocated to the streaming platform as needed and according to coordination of the orchestrators.

It is to be noted that in some embodiments orchestrator cluster 220 also contains a real time video highlight manager 191 and/or real time video highlight marker(s) 190. The real time video highlight manager 191 monitors the real time video highlight marker(s) 190 in the streaming platform 200 through collecting performance data from the workers (e.g., the performance data collected along with the control flows, as the control and performance data flows illustrated at reference 285) and determines if video highlight segments are marked. When video highlight segments are marked, the real time video highlight manager 191 and/or real time video highlight marker(s) 190 can monitor and provide notification about the availability of the video highlight segments to an operator (e.g., for logging purposes) and store/distribute the video highlight segments along with the corresponding video streams. While the real time video highlight manager 191 is illustrated as a standalone entity of the orchestrator cluster 220, the real time video highlight manager 191 (and the real time video highlight marker(s) 190 not shown in the Figure) may be integrated with other entities such as orchestrators 222 to 224. Additionally, a portion of the real time video highlight manager 191 may be within the orchestrator database 226 in one embodiment.

For the streaming platform 200, a graph of tasks is used to process a media workflow. A media workflow, also referred to as a workflow or channel (the terms workflow and channel are used interchangeably in the specification), represents a processing work flow that transforms an individual incoming data stream (e.g., a video source) into its configured output data stream(s), and it contains all of the necessary information used to create a directed task graph and to calculate the correct parameters for each task required in order to correctly transform the incoming data stream into the specified output data stream(s). During workflow creation, the orchestrator is responsible for compiling a channel definition (e.g., using the JavaScript Objection Notation (JSON) format) into a directed graph of tasks (referred to as a task graph) with associated configuration data and for assigning those tasks into logical groups (referred to as task groups) based on estimated resource requirements. The directed graph of tasks is a directed acyclic graph (DAG) of tasks for processing the video source. A DAG is a directed graph with no directed cycles. The directed graph is formed by a collection of nodes (also referred to as vertices) and directed edges, each edge connecting one node to another, such that there is no way to start at a node and follow a sequence of edges that eventually loops back to the node. Each node of the task graph represents a processing task, and each edge represents a data flow across two processing tasks and corresponding input and output of each processing task.

Overall, the streaming platform 200 ingests video sources, transcodes, and transforms the video sources into desired one or more formats for publication and then outputs the resulting video data. The video streaming platform is a distributed architecture using cloud resources, and it is a flexible, scalable, and efficient platform for video processing. The streaming platform 200 receives operator input 230 to the orchestrator cluster 220. The operational input may be from the streaming platform coordinator 170. The communication between the streaming platform coordinator 170 and the streaming platform 200 may include sending requests/confirmations from the streaming platform coordinator and updates/responds from the streaming platform 200. The operator input 230 may receive input also from an operator separately from the streaming platform coordinator 170. The operator input may be in the form of API calls. One of the requests from the streaming platform coordinator is a request to create a workflow for a video source in the streaming platform 200. The request (may be referred to as a channel creation request) may contain a variety of parameters describing the video source and the expected operations. For example, the request may contain at least one of the following:

Mandatory parameters describing the type of the video source (e.g., MPEG-2, MPEG-4, H.265, and etc.), and location of the video source (e.g., ingest protocol, IP address, URI, and etc.).

Indication of whether and how to enable subtitle processing and/or enable advertisement insertion processing for the video source.

The desired video and audio transcoding operations (e.g., how many audio/video layers, the desired output characteristics for each such as video frame size/rate and bitrate, the relevant portion of the incoming data flow to use if applicable) for the video source.

The desired contention protection operations for the published output (e.g., Apple© FairPlay, Microsoft© PlayReady, Adobe© Access DRM, AES-128 Encryption for HTTP live streaming, etc.).

The desired publishing operations to output (e.g., which output format(s) such as HTTP live streaming (HLS), HTTP dynamic streaming (HDS), RTMP, or Microsoft© smooth streaming) to publish, and the destination(s) to send each output format.

Based on the request, the orchestrator cluster 220 creates media workflows for video sources 210, utilizing directed graphs of tasks, and each of the so-called task graphs is a directed acyclic graph (DAG) of tasks for processing the video source. Each task graph contains tasks to be performed by a worker of the streaming platform 200. The tasks are then assigned to workers for execution, and the results are included in the output data flows 284.

A media workflow contains a large number of tasks to be performed by a video streaming platform. An outside-in network management approach (e.g., SNMP), where the network management system can only collect performance data at a worker level, cannot provide efficient performance monitoring of the processing of the media workflow within the video streaming platform, let alone video quality assessment with regard to the processing blocks in a timely fashion. For example, the worker is often implemented as a virtual machine in the video streaming platform, and using SNMP, an operator of the video streaming platform may determine a percentage of central processing unit (CPU) usage. The CPU usage may be too high (90%) for the worker, but without knowing the details of the processing of the media workflow, SNMP cannot determine the reason of the high CPU (e.g., it can be caused by malfunctioning of decoder, frame rate conversion, scaling, and/or video encoders), thus cannot provide effective mitigation.

Operations of Marking Video Highlight Segments in a Video Streaming Platform

Using machine learning techniques, embodiments of the invention detect and demarcate various aspects of a video stream, including highlights (e.g., big plays/goals/penalties in sports, explosions/storms/fires in news) and changes in flow (e.g., snaps in football, change of batters in baseball, face-offs in hockey). Based on the detection/demarcation, video highlight segments are identified and transmitted to playback devices as a part of the video stream (either in-band within the video stream or out-band as a separate/parallel stream along with the video stream). An end-user may use the video highlight segments to gain an interactive streaming experience for live events, and such experience is better than the largely identical broadcast live stream.

Figure 3:
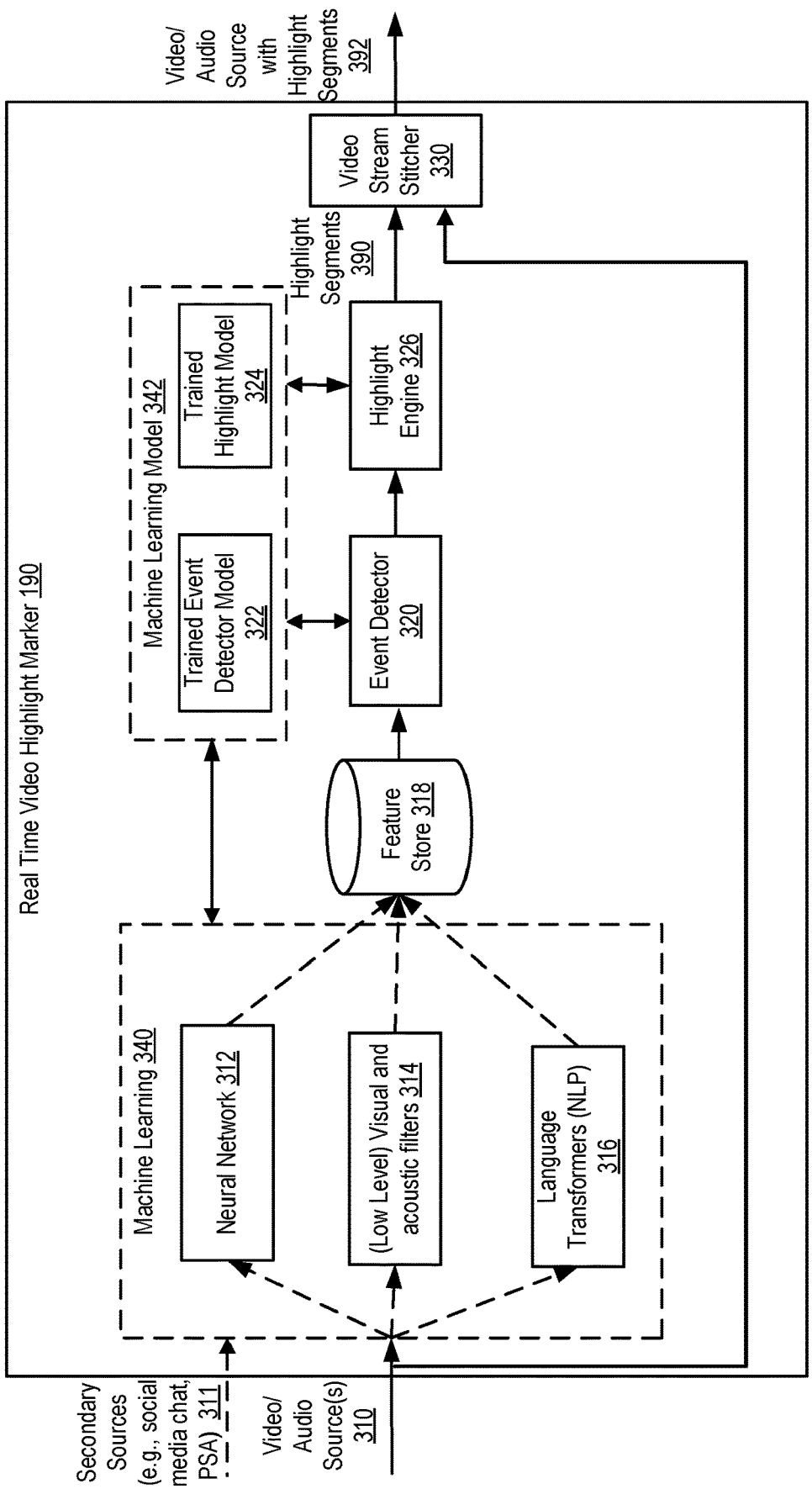
FIG. 3 a diagram of one embodiment of a real time video highlight marker in the video streaming system per some embodiments.

In a video streaming platform (such as the ones shown in FIGS. 1A-B), the video highlight segments of a video stream are marked automatically, e.g., at a real time video highlight marker 190 or real time video highlight manager 191, without human intervention while the video stream is being processed. FIG. 3 is a diagram of one embodiment of a real time video highlight marker in the video streaming system per some embodiments. The real time video highlight marker 190 may be implemented in the video streaming systems 100, 150, or the streaming platform 200 discussed herein above. Additionally, the real time video highlight manager 191 may include entities similar to the ones in the real time video highlight marker 190 as shown in FIG. 3.

One or more video/audio sources 310 are received by the real time video highlight marker 190. In some embodiments, each video/audio source comprises the video source 130 or video source 210 and may include metadata corresponding to the video/audio source. Additionally, one or more secondary sources 311 that are contemporaneous to the one or more video/audio sources 310 may be provided to the real time video highlight marker 190.

A secondary source contemporaneous to a video/audio source 310 may include posted social media chats/messages on social media platforms and online discussion forums such as Facebook, YouTube, Whatsapp, Instagram, TikTok, Snapchat, Reddit, Pinterest, Twitter, and LinkedIn, and broadcast messages (e.g., ones from a public service announcement (PSA) or from a private entity). The changing volume of the social media chats/messages regarding an event displayed in the video/audio source may reflect real time reaction of the event as it happens and can be a good indication whether highlight moments of the event have just happened. For example, a trending tag of homerun on social media platforms about an ongoing baseball game likely indicates that someone in the game has just scored a homerun, and that may be a highlight worthy of being replayed and shared. Similarly, a broadcast message from the PSA announcing an upcoming severe weather condition likely means contemporaneous content within the local weather channel is worthy of being replayed. The secondary source provides additional information to enhance the machine learning method to identify the context and highlight segments of the contemporaneous video/audio source. The context of a video/audio source includes the type of the source and/or a particular event within the type of source. For example, for the video/audio source of a baseball game, the context may be a hit, a homerun, or a pitch.

A video/audio source 310 and (optionally) contemporaneous secondary source 311 are provided to the machine learning module 340, which applies the machine learning model 342 to extract features from the video/audio source, including video frames, corresponding audio frames and metadata (e.g., video/audio metadata, text converted from audio, and any other sources of metadata).

For the video frames, the extracted features include compression details (such as quantization parameters, bitrate, frame per second); segmentation of frames; objects in frames; pixel intensity in each frame to identify hot/cold zones. For audio frames, the extracted features include pitch and amplitude of audio; dead/live audio detection; and context as a feature with audio to text transformation. For metadata, the extracted features include channel configuration details and video stream header information.

The machine learning module 340 includes neural network 312, visual and acoustic filter 314, and language transformers 316, one or more branches of which may be applied to an incoming video/audio source 310 and (optionally) its contemporaneous secondary source 311.

The neural network 312 detects actions in the video and/or audio streams within the video/audio source. This neural network 312 can be a convolutional neural network (CNN) that use convolution operation in at least one of its layers and/or deep neural network (with at least three layers). The detection of actions can be used to identify scenery changes in the frames of the video stream and provide indication of the context/highlight of the video stream. The detected actions are features that may reveal the context of the video stream.

The visual and acoustic filters 314 capture the relevant features for event detection from the video and/or audio streams. In some embodiments, the visual and acoustic filters 314 captures low-level features only. For example, they identify low-level visual features such as color properties, texture properties, and shape-based properties within frames of a video stream, and they also identify low-level acoustic features such as acoustic, prosodic, and spectral properties of the audio stream. The visual and acoustic filters 314 may use amplitude analysis to extract short time energy or amplitude outliers of the audio stream to determine the context/highlight of the video stream.

The language transformers 316 analyze the audio streams to determine the context of the video/audio source 310. A language transformer may use a natural language processing (NLP) model to determine the context and find the relevant auditory gains using audio attributes of the video to energize the context. The determined the context of the video/audio source 310 by the language transformers 316 may be collaborated with the context determined by the neural network 312 and/or the visual and acoustic filters.

The extracted video and/or acoustic features are stored in a database shown as feature store 318. The extracted features are then provided to an event detector 320 to determine whether an event has occurred, by applying the machine learning model 342. The machine learning model 342 may include a model specifically for event detection, trained event detector model 322, while another model, trained highlight model 324, to identify highlight segments within a video stream. Alternatively, the trained event detector model 322 and highlight model 324 are integrated into a single machine learning model. The event detector 320 determines the context of a video stream, e.g., when the extracted features from the input sources reveal a bat and a ball in consecutive video frames, the event detector may determine the context of the video stream is a baseball game, from which a set of highlight segments in the context may be identified. A highlight segment within the context may be the portion of the video stream that covers the full or condensed frames showing a hit, a homerun, or a pitch in a baseball game.

Once the event is detected, the extracted features (or the video frames, corresponding audio frames, and/or metadata containing the extracted features) are provided to the highlight engine 326, through which the highlight segments are identified. The identification is through applying the machine learning model 342 (or more specifically the trained highlight model 324) on the extracted features (or the video frames, corresponding audio frames, and/or metadata containing the extracted features). The highlight segments 390 are identified and provided to video stream stitcher 330 so the highlight segments can be marked in the video stream. Note that video stream stitcher 330 may accumulate frames to be highlighted—once the starting frame of a highlight is detected, it accumulates frames into the highlight segment (or segments) until the end frame of the highlight is detected. For example, the starting frame of a highlight is detected and the following 6 seconds segment of the video stream belong to the highlight segment, yet a subsequent commercial break does not belong to the highlight segment so they are skipped in marking the highlight segment. The frames (or a subset of) in the video segment after the commercial break are then marked as a part of the highlight segment, and the marked further frames are accumulated ("stitched") to the highlight segment. The highlight segment may include frames from multiple video segments until the end frame is detected.

As shown as the video/audio source with highlight segments 392, the video stream stitcher 330 may provide video highlight segment(s) as a separate/parallel stream along with the corresponding streams of the video/audio source 310 (e.g., an out-of-band video highlight segment), or it may be integrated within the corresponding streams (e.g., an in-band stream or the original video stream in which frames within highlight segments being marked). In both cases, a notification is provided to indicate the availability of the highlight segments in the video stream. The notification, including the determined context, may be used by the playback devices to play the highlight segments as discussed in further detail herein.

Marking Video Highlight Segments Using Machine Learning

As shown in FIG. 3, machine learning is used to extract features from video/audio sources and contemporaneous secondary sources, detect event, and identify highlight segments in video/audio sources. A machine learning is trained to perform the tasks using known video streams.

Figure 4:
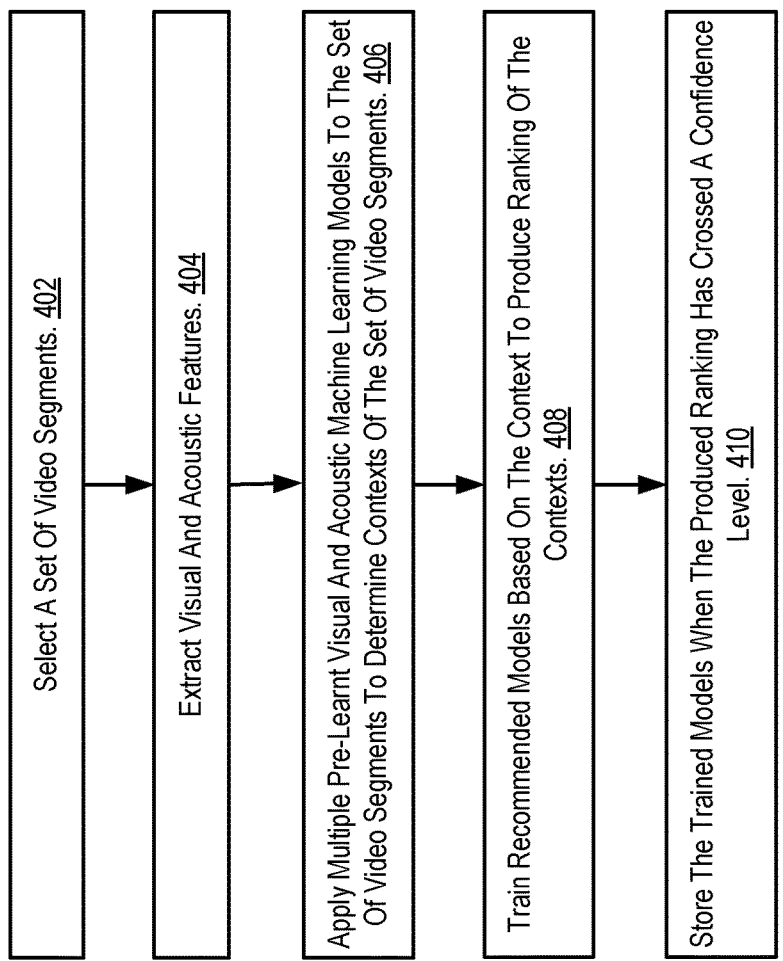
FIG. 4 is a flowchart of a process to train machine learning models per some embodiments.

FIG. 4 is a flowchart of a process to train machine learning models per some embodiments. The process is illustrated at a high level to represent the overall function of video highlight identification in a video streaming system. At reference 402, a set of video segments are selected to train the machine learning models. The set of video segments have known features. For example, multiple video segments of baseball games with homerun sections are provided, along with corresponding segments in contemporaneous secondary sources.

At reference 404, visual and acoustic features are extracted. The extraction of the features may use one or more of neural network 312, visual and acoustic filter 314, and language transformers 316 discussed herein above. At reference 406, multiple pre-learnt visual and acoustic machine learning models are applied to the set of video segments to determine context of the set of video segments.

The machine learning models can be one or more of linear regression, support vector machine, naive bayes, logistic regression, and other models. The pre-learnt visual and acoustic machine learning models use default parameter values of these models if no values have been obtained through prior learning. The Shapley Additive Explanations (SHAP), deepSHAP, local interpretable model-agnostic explanations (LIME) may be used for the machine learning modeling. The most relevant context in the set of video segments may be identified and assigned weightages.

At reference 408, a set of machine models are trained for the context to produce rankings of the contexts. The training may compare the machine learning results from the models and the known features of the video segments and adjust parameter values of the machine learning models to yield better prediction. The accuracy of the prediction of a machine learning model may be measured using different methods. For example, the training may use receiver operating characteristics (ROC) and the area under the curve (AUC) to determine the accuracy of a classifier model, Kullback-Leibler (KL) Divergence to determine the accuracy of auto encoding, the adjusted F-score to determine model accuracy, and cross-entropy loss for Long Short-Term Memory (LSTM) accuracy.

The rankings of the contexts indicate confidence level of the context determination. If the confidence level of the trained machine learning model is low—the accuracy of the prediction is below a confidence level, the machine models are trained again. Once the confidence level of the trained machine learning model has crossed a confidence level, the trained models are stored for the context as recommended machine learning models at reference 410.

Multiple sets of video segments in different known contexts may be selected to train the machine learning models. For different contexts, different machine learning models and/or same machine learning model with different parameter values may be identified as the most suitable. For example, one set of machine learning models may be the best for baseball games, while another is the best to identify breaking news. The trained models may be stored in machine learning model 342 as the trained event detector model 322 to detect events about which video highlight segments may be identified. The video highlight model may be trained similarly using video segments with known highlights in some embodiments.

Figure 5:
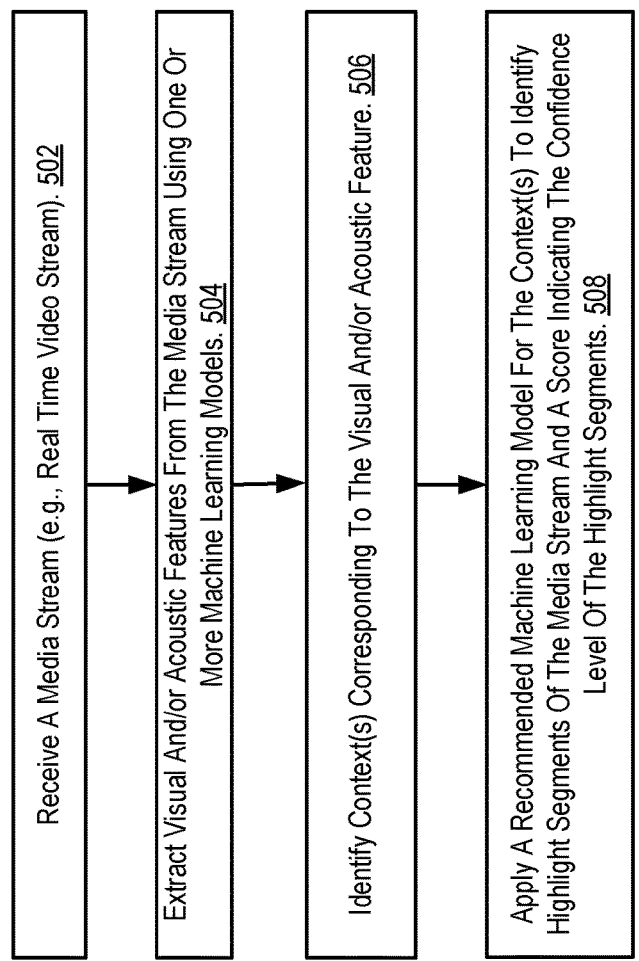
FIG. 5 is a flowchart of a process to apply machine learning to identify highlight segments per some embodiments.

Once the machine learning models are trained, they can be used to identify highlight segments from incoming media streams. FIG. 5 is a flowchart of a process to apply machine learning to identify highlight segments per some embodiments. The process may be performed by the real time video highlight marker 190 or the real time video highlight manager 191 discussed herein above.

At reference 502, a media stream is received. The media stream may be a real time video/audio source to be processed by a video processing platform such as the video/audio source 310 discussed herein above.

At reference 504, visual and acoustic features are extracted from the media stream. In some embodiments, the extraction may be performed by one or more of neural network 312, visual and acoustic filter 314, and language transformers 316 discussed herein above. Then at reference 506, the one or more contexts corresponding to the visual/acoustic features are identified. For example, for a media stream of a baseball game, which is identified through extracting the features, the corresponding contexts (e.g., hits, homeruns, or pitches) are identified.

In some embodiments, only extracted features for which multiple contexts the machine learning models can identify are used to mark highlight segments. Doing so may remove false alarms—when a machine learning model has only trained for one context to identify highlight segments, the identification can be unreliable. In that case, the extracted features may be ignored.

At reference 508, a recommended machine learning model is applied for the identified one or more contexts to identify one or more highlight segments of the media stream, and a confidence score is provided by the recommended machine learning model as well to indicate the confidence level of the one or more highlight segments to be worthy of replay. Note that the highlight segments may be consecutive or discrete frames within the duration of the media stream as discussed herein above. Once the highlight segments are identified, an availability indication of the highlight segments is provided in the media stream so that a playback device may play the highlight segments along with the media stream.

In some embodiments, the process determines whether multiple frames of the media stream are identified to be within the highlight segments, and if only a single frame (or small number of frames) are identified as being worthy of highlighting, the single frame may be ignored and the searching for the highlight segment continues (e.g., the flow goes back to reference 502).

By marking the video highlight segments in a media stream as the media stream is processed through a video streaming platform, the video highlight segments can be generated in in real time or near real time (within seconds or minutes). The contemporaneous marking of the highlight segments is advantageous over prior art, which may mark highlight segments in a static setting (e.g., stored video content), as marking the highlight segments in a live streaming platform can be scaled to offer better user experience to thousands or even millions of end users when viewing a live event (e.g., sports, live performance, breaking news).

Playback Based on the Highlighted Segment

The identified highlight segments and the score associated with the highlight segments can be used by a playback device to offer interactive user experience to an end-user to view both a video stream and the highlight(s) within the video stream seamlessly.

Some augmentation of video content is available in current systems by displaying metadata such as statistics in the area around the player, such augmentation has largely been to the webpage, not to the video playback experience itself. Additionally, while the scrub bar (or deep links within a video stream at key moments) may add text to indicate the content at particular segments of the video content (e.g., goals and penalties may be indicated for a game), such addition is added after the video content is already streamed/broadcast live.

An end user of the video content is largely expected to watch linearly and is dependent on the (often broadcast) content producer's decision to show highlights or provide an instant replay. Of course, streaming viewers can rewind, and some platforms use the scrub bar to jump back to a previous point, yet without knowing starting from which point that the content is worthy of replaying, the user experience is tiresome.

For example, a viewer steps away for a few minutes and misses a big play. Depending on the playback device (a client of a video streaming platform) and how long the playback device has been buffering, the viewer may not be able to rewind at all. Even if it is possible, the viewer still must find the relevant point in time manually. In doing so the viewer might accidentally view part of the action they wanted to see or, alternatively, go back too far or not far enough. This tends to be even more difficult on mobile devices where the viewer controls are smaller and more sensitive. Finally, once the viewer has revisited the section they wanted to see, they need to either continue watching far behind live, go through the whole process again to find where they left off, or jump to live and possibly miss something else noteworthy.

Another viewer, joining the event late might want to see highlights between the beginning and the current point in the event. The customer can't view highlights without leaving the live stream or curate those highlights to a specific timeframe or other attributes (e.g., in a game, watching only highlights of a player or a team). This is because highlight generation has been an on-demand effort which has been either manual or semi-automated in video-on-demand (VOD) assets.

All these limitations reduce user engagement and do not provide a rich media experience. With embodiments of the invention, the video streaming platform may mark highlight segments of a video stream as the video stream is processed and provide one or more indications when the highlight segments of the video stream are ready to be played, so that a viewer may quickly view highlight segments or navigate the video stream in a context aware manner. For example, when the indication may indicate that a marked highlight segment is a last down resulting in score, and the viewer may select the highlight segment using a GUI interface of the playback device and select the highlight segment to replay.

For example, after a scoring play, a viewer might immediately have an option to "See that again" (provided through a GUI interface on the screen coupled to the playback device), which would jump back to the relevant timestamp, replay the highlight, then return the end user to their previous position. The viewer joining a game late could be presented with the option of viewing condensed highlights between the start of the game (or where they last left off or paused) and the current live coverage. After viewing the condensed highlights, the viewer would be returned directly to the live action. Additionally, playback controls could be customized based on the content of the media stream. For example, a viewer might have the ability to jump back "1 play," "1 snap," "1 batter," all of which may be indicated through the GUI interface that the viewer may select to play back. The display of the content of the highlight segments is based on the context determined in the machine learning process discussed herein above. Additionally, the highlight segments in a single video stream, or highlight segments from multiple video streams may be assembled together and form a new video stream to be replayed and shared. For example, one may collect the highlight segments of dunks by a particular NBA player in a week against different teams and assemble a highlight reel for the player to replay and share. The collection of the highlight segments may be done through the GUI interface provided by the playback device, where the GUI interface may be accessed through a remote control, keyboard input, a smart speaker (e.g., Amazon Alexa, Google Nest, Apple Siri, or another smart voice assistant application), or other input devices/services.

The provided one or more indications may identify the relevant cue points in the video stream for key moments as they occur. For example, a football snap or a batter coming up to bat might make up cue points, and the indications identify the starting and end of a key moment as a highlight segment, and the playback device may display full highlight segment on the screen, or only the starting point in some embodiments. A video streaming platform may provide the indications as part of a video stream (e.g., as in-band metadata within the video stream, streaming manifest tags, or out-of-band API data), and the indications are aligned with the timing data of the video stream enabling a playback device to jump to the exact point in the video stream.

Because the highlight segments are marked as the corresponding video stream is processed in the video streaming platform in real time, the video streaming platform cannot determine how an event will turn out in the future (which may determine whether a particular segment is worthy of being highlighted). In that case, the video streaming platform may mark one or more relevant time points in a video stream based on the detected context of the video stream in real time and the significance of the relevant time points may be determined later. For example, the frame showing the snap of the ball in a football game may be identified in real time but the frame may or may not be a part of a highlight segment. If, however, the snap of the ball later turns out to be the beginning of a touchdown drive, the frame showing the snap may be identified as a highlight segment. The retroactive identification of the highlight segments is context specific, and the machine learning model can be trained to provide the near real time identification—the delayed identification is because of the nature of the video stream, not any deficiency of the embodiments.

The provided one or more indications may be visual indicators to show a viewer where replay or highlight opportunities exist. This could be shown as indicators on the scrub bar of a video stream, or the GUI interface discussed herein.

The provided one or more indications may have textual descriptions so that the playback device may display them to a viewer, which can decide if they want to watch it. Each highlight segment will come with a confidence score based on the context of the video stream and relevancy of the highlight segment relevancy in the context. This will help the playback device to intelligently engage a viewer on the total number of highlight segments and provide the most effective highlights based on the confidence score.

While the highlight segments of a video stream can be rendered when the viewer pauses viewing of the video stream, the highlight segments of the video stream may also be rendered along with the rendering of the video stream itself. For example, either the highlight segments or the video stream may be viewed using picture-in-picture while the other is viewed as the main display.

Through the video streaming platform providing the highlight segments, the availability indication of a highlight segment, and/or the corresponding confidence score, a viewer can quickly find the desired content without relying on the content producer, the viewer can stay within a current video stream (paused or rendered concurrently with highlight segments using picture-in-picture) and still replay the exciting highlight segments. The viewer will have a much more engaging experience with the video stream provided by the video streaming platform implementing embodiments of the invention.

Operations of Some Embodiments of the Invention

Figure 6:
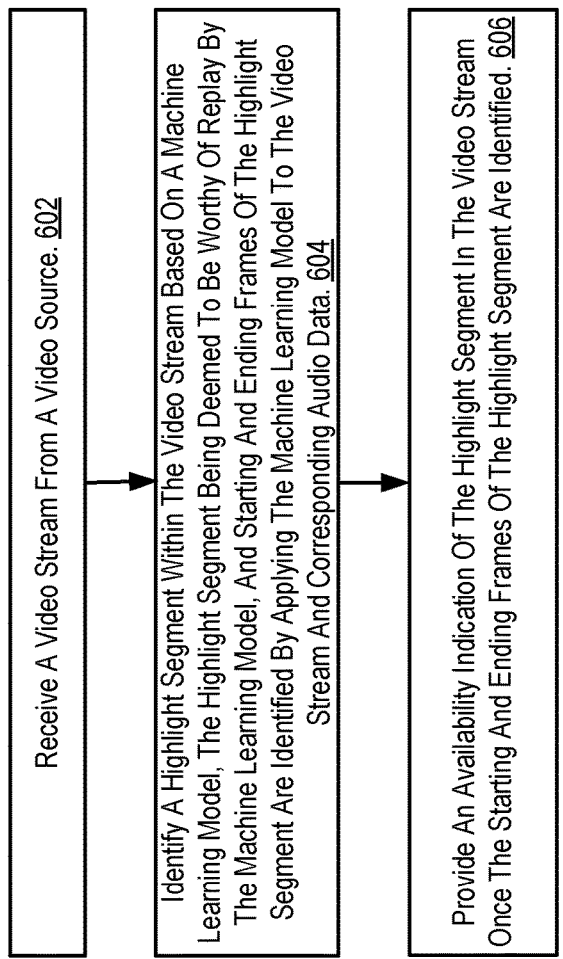
FIG. 6 is a flowchart of a process to identify video highlight segments per some embodiments.

FIG. 6 is a flowchart of a process to identify video highlight segments per some embodiments. The process may be performed by the real time video highlight marker 190 or the real time video highlight manager 191 discussed herein above. At reference 602, a video stream is received from a video source. The video source may be video source 130 or video source 210 and may include metadata corresponding to the video/audio source.

At reference 604, a highlight segment within the video stream is identified based on a machine learning model, the highlight segment being deemed to be worthy of replay by the machine learning model, and starting and ending frames of the highlight segment being identified by applying the machine learning model to the video stream and corresponding audio data. At reference 606, an availability indication of the highlight segment in the video stream is provided once the starting and ending frames of the highlight segment are identified.

In some embodiments, applying the machine learning model to the video stream and corresponding audio data comprises extracting features of the video stream and corresponding audio data to be used to apply the machine learning model as discussed herein above.

In some embodiments, extracting the features of the video stream and corresponding audio data is based on identifying energy or amplitude outliers of the video stream and corresponding audio data.

In some embodiments, extracting the features of the video stream and corresponding audio data is based on detecting actions within the video stream using a neural network.

In some embodiments, extracting the features of the video stream and corresponding audio data is based on language transformation that converts the corresponding audio data into text.

In some embodiments, the machine learning model is applied further on corresponding metadata of the video stream and corresponding audio data to identify the starting and ending frames of the highlight segment.

In some embodiments, the machine learning model is applied further on secondary sources contemporaneous to the video stream to identify the highlight segment of the video stream.

In some embodiments, providing the availability indication of the highlight segment comprises providing a text to indicate context of the highlight segment based on output of the machine learning model.

In some embodiments, providing the availability indication of the highlight segment comprises providing a score to indicate a confidence level that the highlight segment is worthy of replay.

In some embodiments, the highlight segment is to be played along with the video stream as a picture-in-picture stream upon a user request based on the availability indication of the highlight segment.

Electronic Devices Implementing Embodiments of the Invention

Figure 7:
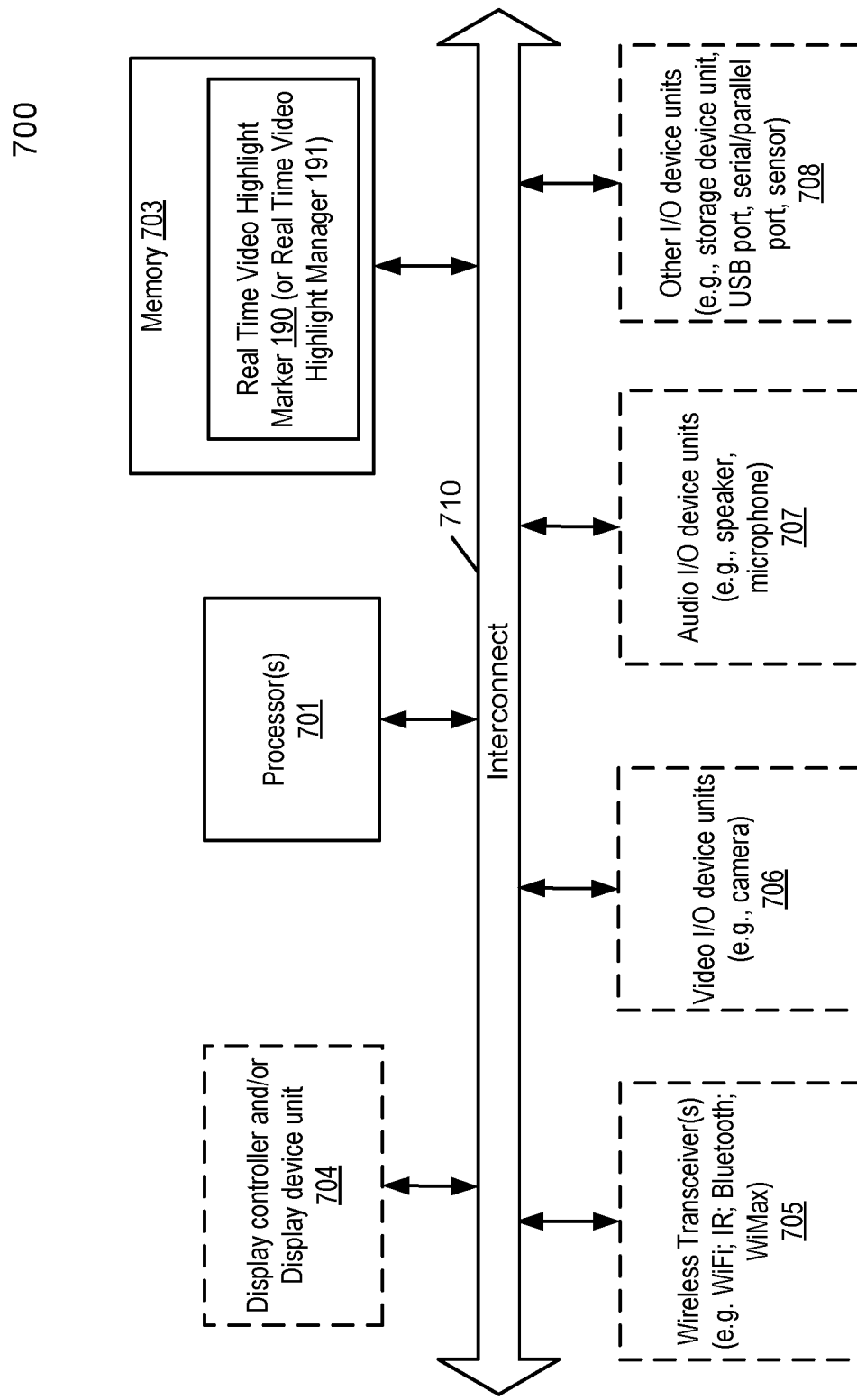
FIG. 7 is a block diagram illustrating an electronic device that may implement as a real time video highlight marker or a real time video highlight manager of a video streaming platform in a cloud computing environment according to some embodiments.

FIG. 7 is a block diagram illustrating an electronic device that may implement as a real time video highlight marker 190 or a real time video highlight manager 191 of a video streaming platform in a cloud computing environment according to some embodiments. The electronic device may be a computing device (e.g., a computer server) of a cloud computing environment). The system 700 may implement the real time video highlight marker 190 or the real time video highlight manager 191 described above performing any of the processes or methods for training machine learning models and applying the trained machine learning models to identify highlight segments in a video streaming system described above. The system 700 can include many different components. These components can be implemented as integrated circuits (ICs), portions thereof, discrete electronic devices, or other modules adapted to a circuit board such as a motherboard or add-in card of a computing system, or as components otherwise incorporated within a chassis of the computing system. Note also that the system 700 is intended to show a high-level view of many components of the computing system. However, it is to be understood that additional components may be present in certain implementations and furthermore, different arrangement of the components shown may occur in other implementations.

In one embodiment, the system 700 includes a processor 701, memory 703, and optionally device units 704-708 that are interconnected via a bus or an interconnect 710. A processor 701 may represent a single processor or multiple processors with a single processor core or multiple processor cores included therein. The processor 701 may represent one or more general-purpose processors such as a microprocessor, a central processing unit (CPU), or processing device. More particularly, the processor 701 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 701 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

The processor 701 may communicate with the memory 703, which in an embodiment can be implemented via multiple memory devices to provide for a given amount of system memory. The memory 703 may include one or more volatile storage (or memory) devices such as random-access memory (RAM), dynamic RAM (DRAM), synchronous DRAM (SDRAM), static RAM (SRAM), or other types of storage devices. The memory 703 may store information including sequences of instructions that are executed by the processor 701, or any other device units. For example, executable code and/or data of a variety of operating systems, device drivers, firmware (e.g., input output basic system or BIOS), and/or applications can be loaded in the memory 703, and executed by the processor 701. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

The memory 703 contains the real time video highlight marker 190 or the real time video highlight manager 191, or related components for training, which may contain instructions to perform the operations of these components as discussed herein above. The real time video highlight marker 190 or the real time video highlight manager 191 and related components may contain functional blocks that implement functions as described herein with relation to the video highlight segment identification process and related training processes discussed herein above. The processor 701 may instantiate the real time video highlight marker 190 or the real time video highlight manager 191 and related components to perform operations to as discussed herein above.

The system 700 may optionally further include input/output (I/O) devices such as the device units 704-708, including display control and/or display device unit 704, wireless transceiver(s) 705, video I/O device unit(s) 706, audio I/O device unit(s) 707, and other I/O device units 708 as illustrated. The wireless transceiver 705 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof.

The video I/O device unit 706 may include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips and conferencing. An audio I/O device unit 707 may include a speaker and/or a microphone to facilitate voice-enabled functions, such as voice recognition, voice replication, digital recording, and/or telephony functions. Other optional devices 708 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. The optional device units 708 may further include certain sensors coupled to the interconnect 710 via a sensor hub (not shown), while other devices such as a keyboard or thermal sensor may be controlled by an embedded controller (not shown), dependent upon the specific configuration or design of the system 700.

The system 700 may be coupled to an orchestrator in an orchestrator as illustrated in FIG. 2. Additionally, the system 700 may be integrated within a streaming platform coordinator 170, similar to the real time video highlight marker 190 illustrated in FIG. 1. The system 700 may perform methods discussed herein above relating to FIGS. 3 to 6.

Note that while the system 700 is illustrated with various components, it is not intended to represent any particular architecture or manner of interconnecting the components; as such details are not germane to embodiments of the present invention. It will also be appreciated that an electronic device having fewer components or perhaps more components may also be used with embodiments of the invention.

Figure 8:
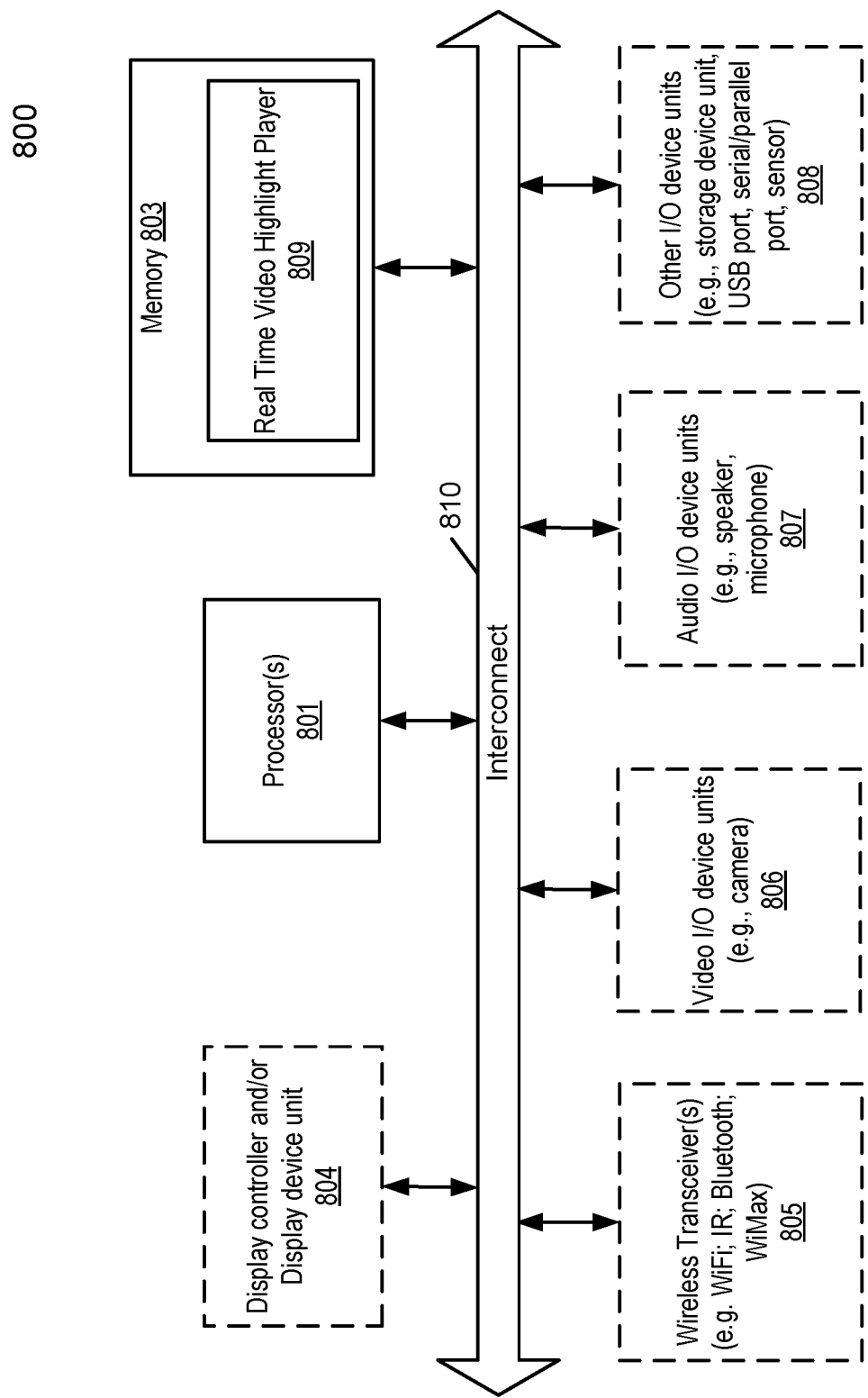
FIG. 8 is a block diagram illustrating an electronic device that may implement as a playback device of a video streaming platform in a cloud computing environment according to some embodiments.

FIG. 8 is a block diagram illustrating an electronic device that may implement as a playback device of a video streaming platform in a cloud computing environment according to some embodiments. The playback device includes hardware and software components similar to the system 700, and it includes a real time video highlight player 809, which may contain instructions to perform the operations of a playback device discussed herein above.

For example, the processor 801 may instantiate the real time video highlight player 809 so that the system 809 may accept highlight segments, the availability indication of a highlight segment, and/or the corresponding confidence score from a video streaming platform, and provide one or more GUI interfaces to an end user of the playback device to replay the highlight segments of highlight segments.

Some portions of the preceding detailed descriptions have been presented in terms of algorithms and symbolic representations of operations on data bits within a computer memory. These algorithmic descriptions and representations are the ways used by those skilled in streaming technology to most effectively convey the substance of their work to others skilled in the art. An algorithm is generally conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a streaming platform device, or similar electronic computing device, that manipulates and transforms data represented as physical (electronic) quantities within the streaming platform device's registers and memories into other data similarly represented as physical quantities within the streaming platform device's memories or registers or other such information storage, transmission or display devices.

It is to be noted that the operations of the flow diagrams are described with reference to the exemplary embodiment electronic devices. However, it should be understood that the operations of flow diagrams can be performed by embodiments of the invention other than those discussed with reference to the electronic devices, and the embodiments discussed with reference to the electronic devices can perform operations different than those discussed with reference to the flow diagrams.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims.

What is claimed is:

1. A method executed by an electronic device in a video streaming platform, the method comprising:
   receiving, a media stream from a media source, wherein the media stream includes a video stream and an audio stream;
   extracting, at least one feature from the video stream and the audio stream;
   determining a context corresponding to the at least one feature, wherein the context includes a source type or a source event;
   identifying, via a machine learning model, a highlight segment within the video stream based on the context, the identifying including determining a starting frame and an ending frame of the highlight segment, wherein the starting frame and the ending frame of the highlight segment are identified by inputting the video stream and audio data corresponding to the at least one feature into the machine-learning model;
   stitching one or more individual frames corresponding to the at least one feature between the starting frame and the ending frame of the highlight segment, wherein at least one frame of the one or more individual frames is a non-consecutive frame; and
   indicating an availability of the stitched one or more individual frames to a playback device in the video stream, wherein indicating the availability includes providing a confidence score based on the context, wherein the indication is aligned with timing data of the video stream.

2. The method of claim 1, wherein extracting the at least one feature from the video stream and the audio stream is based on identifying energy or amplitude outliers of the video stream and corresponding audio stream.

3. The method of claim 1, wherein extracting the at least one feature from the video stream and the audio stream is based on detecting actions within the video stream using a neural network.

4. The method of claim 1, wherein extracting the at least one feature from the video stream and the audio stream is based on language transformation that converts the corresponding audio stream into text.

5. The method of claim 1, wherein the machine learning model is applied further on corresponding metadata of the video stream and corresponding audio stream to identify the starting frame and the ending frame of the highlight segment.

6. The method of claim 1, wherein the machine learning model is applied further on secondary sources contemporaneous to the video stream to identify the highlight segment of the video stream.

7. The method of claim 1, further comprising:
   receiving a user request to play the highlight segment; and
   playing the highlight segment with the video stream as a picture-in-picture stream.

8. The method of claim 1, wherein the at least one feature includes a visual feature and an audio feature, wherein the visual feature includes at least one of: one or more color properties of a frame within the video stream, one or more texture properties of the frame within the video stream, or one or more shape-based properties of the frame within the video stream, and wherein the audio feature includes at least one of one or more audio properties of the audio stream, one or more prosodic properties of the audio stream, and one or more spectral properties of the audio stream.

9. The method of claim 1, wherein the determining the context comprises:
   analyzing, via a natural language processing model, the audio stream corresponding to the video stream to determine the context.

10. A non-transitory machine-readable storage medium that provides instructions that, if executed by a processor, will cause the processor to perform operations comprising:
    receiving, a media stream from a media source, wherein the media stream includes a video stream and an audio stream;
    extracting, at least one feature from the video stream and the audio stream;
    determining a context corresponding to the at least one feature, wherein the context includes a source type or a source event;
    identifying, via a machine learning model, a highlight segment within the video stream based on the context, the identifying including determining a starting frame and an ending frame of the highlight segment, wherein the starting frame and the ending frame of the highlight segment are identified by inputting the video stream and audio data corresponding to the at least one feature into the machine-learning model;

stitching one or more individual frames corresponding to the at least one feature between the starting frame and the ending frame of the highlight segment, wherein at least one frame of the one or more individual frames is a non-consecutive frame; and indicating an availability of the stitched one or more individual frames to a playback device in the video stream, wherein indicating the availability includes providing a confidence score based on the context, wherein the indication is aligned with timing data of the video stream.

11. The non-transitory machine-readable storage medium of claim 10, having further instructions stored therein, which when executed by the processor cause the processor to perform additional operations, wherein the machine learning model is applied further on corresponding metadata of the video stream and corresponding audio stream to identify the starting frame and the ending frame of the highlight segment.

12. The non-transitory machine-readable storage medium of claim 10, having further instructions stored therein, which when executed by the processor cause the processor to perform additional operations, wherein the machine learning model is applied further on secondary sources contemporaneous to the video stream to identify the highlight segment of the video stream.

13. The non-transitory machine-readable storage medium of claim 10, wherein the at least one feature includes a visual feature and an audio feature, wherein the visual feature includes at least one of: one or more color properties of a frame within the video stream, one or more texture properties of the frame within the video stream, or one or more shape-based properties of the frame within the video stream, and wherein the audio feature includes at least one of one or more audio properties of the audio stream, one or more prosodic properties of the audio stream, and one or more spectral properties of the audio stream.

14. The non-transitory machine-readable storage medium of claim 10, wherein the determining the context comprises:
analyzing, via a natural language processing model, the audio stream corresponding to the video stream to determine the context.

15. An electronic device comprising:
a non-transitory machine-readable storage medium to store instructions; and
a processor coupled to the non-transitory machine-readable storage medium, the processor to process the stored instruction to perform:
receiving, a media stream from a media source, wherein the media stream includes a video stream and an audio stream;
extracting, at least one feature from the video stream and the audio stream;
determining a context corresponding to the at least one feature, wherein the context includes a source type or a source event;
identifying, via a machine learning model, a highlight segment within the video stream based on the context, the identifying including determining a starting frame and an ending frame of the highlight segment, wherein the starting frame and the ending frame of the highlight segment are identified by inputting the video stream and audio data corresponding to the at least one feature into the machine-learning model;
stitching one or more individual frames corresponding to the at least one feature between the starting frame and the ending frame of the highlight segment, wherein at least one frame of the one or more individual frames is a non-consecutive frame; and
indicating an availability of the stitched one or more individual frames to a playback device in the video stream, wherein indicating the availability includes providing a confidence score based on the context, wherein the indication is aligned with timing data of the video stream.

16. The electronic device of claim 15, wherein extracting the at least one feature from the video stream and the audio stream is based on identifying energy or amplitude outliers of the video stream and corresponding audio stream.

17. The electronic device of claim 15, wherein extracting the at least one feature from the video stream and the audio stream is based on detecting actions within the video stream using a neural network.

18. The electronic device of claim 15, wherein extracting the at least one feature from the video stream and the audio stream is based on language transformation that converts the corresponding audio stream into text.

19. The electronic device of claim 15, wherein the at least one feature includes a visual feature and an audio feature, wherein the visual feature includes at least one of: one or more color properties of a frame within the video stream, one or more texture properties of the frame within the video stream, or one or more shape-based properties of the frame within the video stream, and wherein the audio feature includes at least one of one or more audio properties of the audio stream, one or more prosodic properties of the audio stream, and one or more spectral properties of the audio stream.

* * * * *